United States Patent Office 2,788,092
Patented Apr. 9, 1957

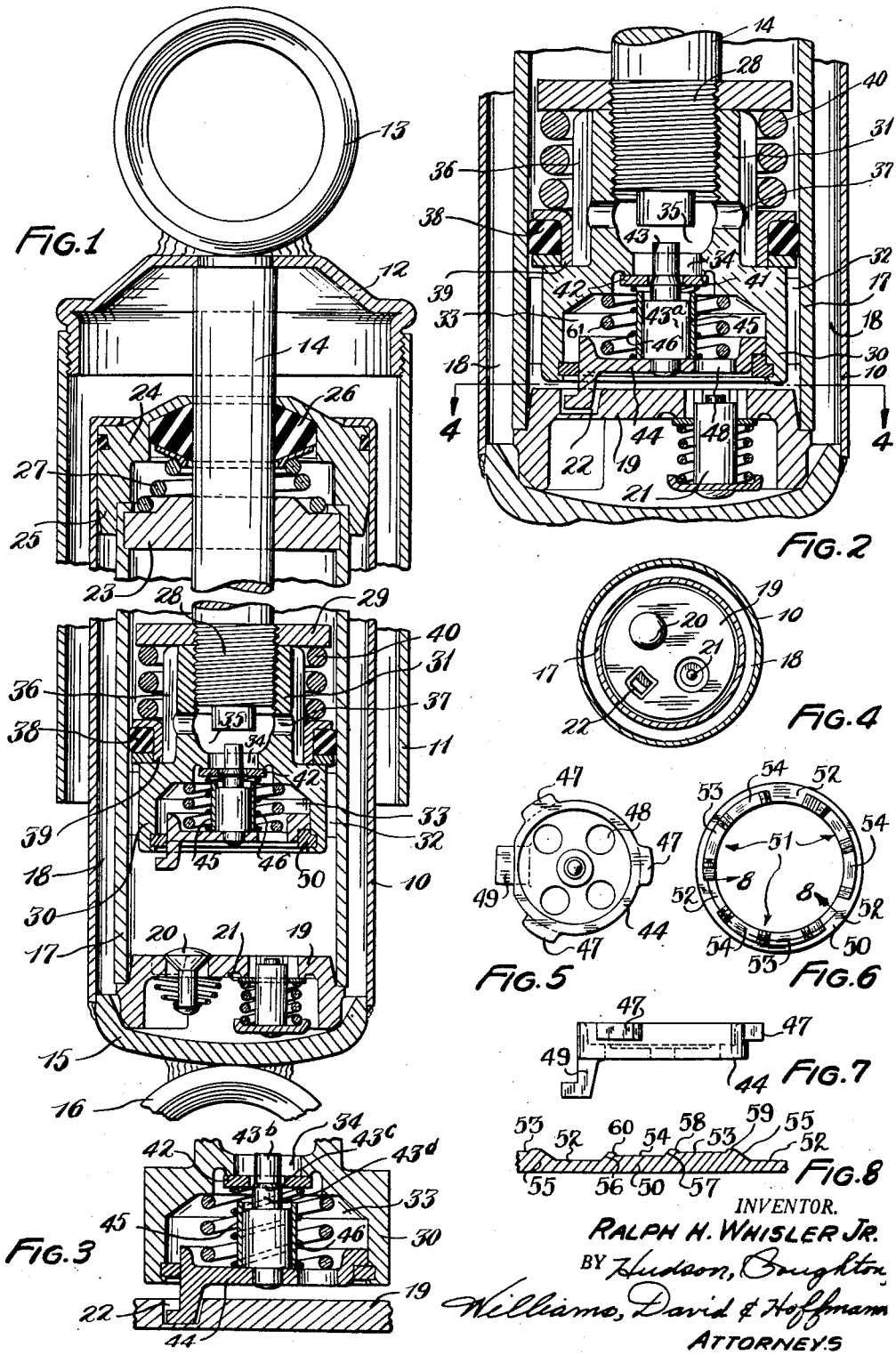

2,788,092

SHOCK ABSORBER

Ralph H. Whisler, Jr., Euclid, Ohio, assignor to The Gabriel Company, Cleveland, Ohio, a corporation of Ohio Application July 27, 1954, Serial No. 445,957

3 Claims. (Cl. 188—88)

This invention relates to a shock absorber, and more particularly, to a direct double-acting hydraulic shock absorber.

Direct double-acting hydraulic shock absorbers when mounted on motor vehicles usually have their opposite ends connected, respectively, to the frame and axle of the vehicle. When the vehicle springs are compressed, as occurs when the wheels of the vehicle strike a roadway elevation, the pistons of the shock absorbers move in their impact or compression stroke i. e., usually downwardly in the cylinders of the shock absorbers. When the vehicle springs expand, the pistons of the shock absorbers move in their recoil or rebound stroke i. e., usually upwardly in the cylinders.

Ordinarily, the pistons of direct double-acting hydraulic shock absorbers are provided with valve means controlling the flow of oil through or around the pistons from one side thereof to the other side during the impact stroke of the piston and such valve means are usually designated as "impact valves." Also, the pistons of direct double-acting hydraulic shock absorbers are provided, usually, with valve means controlling the flow of oil through or around the pistons from one side to the other side thereof during the recoil or rebound stroke, and such valve means are termed "recoil or rebound valves." Frequently, the "recoil or rebound valves" of these shock absorbers are spring-loaded, and hence, unseat only after a predetermined pressure obtains in the working cylinder which overcomes the spring load. Also, the pistons of these shock absorbers, usually, are provided with a fixed "recoil or rebound orifice" through which the oil can flow during the recoil or rebound stroke, when the "recoil or rebound valve" is seated.

An object of the present invention is to provide in a direct double-acting hydraulic shock absorber improved and novel means for adjusting the spring load on the "recoil or rebound valve," and which means can be actuated without disassembling the shock absorber and merely by collapsing the shock absorber and relatively rotating the parts thereof.

A further object of the invention is to provide in a direct double-acting hydraulic shock absorber "recoil or rebound orifice" means in the piston of the shock absorber and which orifice means can be varied in capacity by collapsing the shock absorber and relatively rotating the parts thereof and without the necessity of disassembling the shock absorber to accomplish such adjustment.

A still further object of the invention is to provide in a direct double-acting hydraulic shock absorber means for adjusting the spring load on the "recoil or rebound valve" and the capacity of the "recoil or rebound orifice" simultaneously by collapsing the shock absorber and relatively rotating the parts thereof and without the necessity of disassembling the shock absorber.

Further and additional objects and advantages not hereinbefore specified will become apparent hereinafter during the detailed description of an embodiment of the invention, which is to follow, and which embodiment is illustrated in the accompanying drawing forming part of this specification and wherein:

Fig. 1 is a sectional view through a direct double-acting hydraulic shock absorber embodying the invention;

Fig. 2 is a fragmentary sectional view similar to Fig. 1, but on a larger scale;

Fig. 3 is a fragmentary sectional view similar to a portion of Fig. 2, but on a reduced scale from Fig. 2 and shows a different adjusted relationship as to the "recoil or rebound valve" spring and the "recoil or rebound orifice" than is shown in Fig. 2;

Fig. 4 is a transverse sectional view taken substantially on line 4—4 of Fig. 2, looking in the direction of the arrows;

Fig. 5 is a detached plan view of the "rebound or recoil valve" spring retainer;

Fig. 6 is a detached plan view of the cam member which cooperates with the retainer of Fig. 5 to adjust the position of the latter to vary simultaneously the spring load on the "rebound or recoil valve" and the capacity of the "recoil or rebound orifice";

Fig. 7 is a detached elevational view of the "rebound or recoil valve" spring retainer; and Fig. 8 is a sectional view taken on line 8—8 of Fig. 6, looking in the direction of the arrows.

The direct double-acting hydraulic shock absorber illustrated comprises a substantially cylindrical outer casing 10 which has relative telescoping movement within a cylindrical guard or shield 11 that is spaced radially outwardly from the casing 10. The upper end of the guard or shield 11 is closed by an inverted cup-shaped closure or cap member 12 shown as secured thereto with a screw-threaded connection, but it will be understood that the cap member 12 might be secured to the guard 11 in other ways, as by welding, soldering, spinning or the like. The cap member 12 has an eye 13 fixed to its outer side, while a piston rod 14 is rigidly connected to the cap member 12 and eye 13. The lower end of the casing 10 is closed by a cup-shaped closure member 15 which has secured to its outer side a lower eye 16. The closure member 15 preferably is connected to the casing 10 by being welded thereto although it might be otherwise connected thereto and it will be noted that said closure member extends into and interfits the lower end of the casing 10.

In mounting the shock absorber on a motor vehicle, similar mounting pins or trunnion rods (not shown) may be connected, respectively, to the frame and axle of the vehicle in any suitable manner so as to extend outwardly therefrom in parallel relationship and pass through the eyes 13 and 16. These pins or trunnion rods may be operatively connected with the eyes 13 and 16 by suitable means well known in the art, wherefore relative movement between the frame and axle of the vehicle will cause relative telescoping movement between the casing 10 and the guard 11, and relative movement of the piston rod 14 and the piston secured thereto in the pressure or working cylinder, as will later become apparent.

The pressure or working cylinder 17 is disposed within the casing 10 in spaced concentric relationship therewith so that the space defined by the casing 10, cylinder 17, closure member 15 and a closure member for the upper end of the casing and cylinder, later to be referred to, constitutes a reservoir 18 for the oil in the shock absorber.

The lower end of the working cylinder 17 is connected to an inverted cup-shaped closure and valve cage member 19 which is also connected to the closure member 15. The member 19 mounts a replenishing valve means 20 and an impact valve means 21 which are fully shown and described in Kieber Patent 2,518,553, August 15, 1950. It will be understood that during the impact or downward stroke of the piston of the shock absorber, oil will flow from the working cylinder 17 through the impact valve assembly 21 when a predetermined oil pressure occurs and thence through passages between the member 19 and the closure member 15 and into the reservoir 18. It will also be understood that during the rebound or recoil or upward stroke of the piston, that the replenishing valve 20 unseats and oil flows from the reservoir through the replenishing valve assembly and into the working cylinder 17 below the upwardly moving piston. The member 19 is provided on its side within the working cylinder 17 with a recess or socket 22 for a purpose later to be pointed out.

The upper or high pressure end of the working cylinder 17 is closed by a plug member 23 having a centrally disposed opening therein and through which opening the piston rod 14 slidably extends. The upper end of the casing 10 is closed by a closure member 24 mounted in the casing and suitably secured thereto. The closure member 24 is provided with inwardly extending portions 25 that contact with the upper end of the cylinder 17. The member 24 is also provided with a centrally disposed recess in which is arranged a double conical piston rod packing 26 through which the rod extends and passes outwardly of the member 24 by means of the central opening provided in the latter. The piston packing 26 is held under compression by a coil spring 27 acting on the tapered inner end of the packing and also abutting the plug member 23.

The construction thus far set forth is well known in the art and per se constitutes no part of the present invention.

The piston rod 14 has its lower end threaded, as indicated at 28, and screwed on this threaded end 28 of the piston rod is a spring abutment plate 29 and also a piston now to be described. The piston includes a lower and larger portion 30 of a diameter such as to slidably interfit the working cylinder 17. The piston further includes an upper portion 31 of a reduced diameter. The periphery of the lower portion 30 is provided with a plurality of circularly spaced axially extending grooves or passages 32 which communicate with the space below the piston and the annular space between the upper portion 31 and the interior of the cylinder 17.

The lower portion 30 of the piston is provided with a counterbore or chamber 33 and its upper end communicates with a bore 34 formed centrally of the piston at the junction of the lower portion 30 and the reduced upper portion 31 thereof. The reduced upper portion 31 of the piston is provided with a central bore 35 of larger diameter than the bore 34 but coaxial therewith, and the upper portion of the bore 35 is threaded so that the piston can be screwed upon the threaded lower end 28 of the piston rod 14 until the upper end of the portion 31 of the piston engages the spring abutment plate 29. The reduced upper portion 31 of the piston is provided, on its circumference, with a plurality of circularly spaced axially extending grooves 36 and the bore 35 is connected to said grooves 36 by means of a plurality of radially extending circularly spaced ports or passages 37.

A flexible packing and valve ring 38 of normally circular cross-section and formed of any suitable material, such as natural or synthetic rubber for instance, is mounted on a carrier 39 which is slidable on the upper portion 31 of the piston. The carrier 39 is in the form of a ring of angle cross-section and its axially extending flange slides on the portion 31 of the piston, while its radially extending flange contacts the packing and valve ring 38. A coil spring 40 surrounds the portion 31 of the piston and has one of its ends abutting the plate 29 and its opposite end the radially extending flange of the carrier 39 and said spring functions to maintain the carrier 39 and packing and valve ring 38 in the position shown in Fig. 1, at which time the carrier abuts the larger or lower portion 30 of the piston, while the ring 38 acts as a valve sealing the flow of oil from the underside of the piston through the passages 32 to the upper side of the piston. It will be understood that during the impact or downward stroke of the piston, occasioned by the compression of the vehicle springs, that as soon as the oil pressure below the piston overcomes the load of the spring 40, the ring 38 and carrier 39 move upwardly on the portion 31 of the piston and away from the portion 30 thus allowing the flow of oil upwardly through the grooves 32. The ring 38 constitutes the piston impact valve in that it controls the flow of oil from the lower side of the piston to the upper side thereof during the impact or downward stroke of the piston in the working cylinder 17.

The piston at the lower end of the bore 34 and within the counterbore or chamber 33 is provided with a seat 41 for a valve disk 42. The valve disk 42 constitutes the piston "recoil or rebound valve" that controls the flow of oil through the piston during the recoil or rebound or upward stroke thereof. The "rebound valve" disk 42 is provided with a central opening through which extends a valve pin 43 and the disk 42 is movable on the valve pin 43, as will later be explained. The valve pin 43 has an enlarged cylindrical portion 43a adjacents its lower end and said pin at its lower end is rigidly connected to a rebound or recoil valve spring retainer 44. A sleeve 45 surrounds the enlarged portion 43a of the valve pin 43, and a recoil or rebound valve spring in the form of a coil spring 46 surrounds the sleeve 45 and has one end abutting the retainer 44 and its opposite end the "rebound or recoil valve" disk 42 and functions to urge said valve disk under the spring load into seating contact with the seat 41.

The valve pin 43, at its upper or free end, has a cylindrical portion 43b of substantially less diameter than the diameter of the central opening of the valve disk 42, and the lower end of this cylindrical portion 43b connects with a conical or tapered portion 43c, while the lower end of the conical portion 43c connects with a cylindrical portion 43d that is slightly less in diameter than the diameter of the opening in the valve disk 42. It will thus be seen that when the portion 43b of the valve pin is positioned in the valve disk 42, a substantial clearance exists between the circumference of the opening and the circumference of the portion 43b, and hence, a maximum "recoil or rebound orifice" would be provided at this time. It will also be seen that when the conical portion 43c of the valve pin 43 is positioned in the central opening of the valve disk 42, the clearance between said conical portion and the circumference of the opening in the valve disk will vary, as between the small upper end of the conical portion 43c and the large lower end thereof, and thus a further variation in the size and capacity of the "recoil or rebound orifice" can be obtained. When the larger cylindrical portion 43d of the valve pin 43 is located in the central opening in the valve disk 42, then only a slight or minimum clearance obtains between the portion 43d and the circumference of the opening and, at such time, a minimum "recoil or rebound orifice" would be provided. Of course, the diameter of the portion 43d of the valve pin 43 could be such as to have a close sliding fit with the central opening in the valve disk 42 if desired, so that there would be no effective "recoil orifice" provided under this relationship.

The inner or upper surface of the recoil or rebound valve spring retainer 44 is dish-shaped and adjacent its upper circumferential edge it is provided exteriorly with three equally circularly spaced radially extending lugs 47. As already stated, the valve pin 43 is rigidly secured centrally to the bottom wall of the dish-shaped retainer 44 and said bottom wall outwardly of its center is provided with a plurality of openings 48, four such openings being shown for purposes of illustration. The retainer 44 on its underside and intermediate two of the lugs 47 is provided adjacent its circumference with an axially extending lug 49 having a foot portion at its free end and which lug, as will later be explained, is adapted to extend into the recess or socket 22 of the member 19 and to bottom on the inner end of said socket or recess. A cam ring 50 has an annular flange that is clamped into an annular groove formed in the wall of the counterbore 33 as for instance by spinning or turning the lower end of the counterbore wall inwardly against said flange. Consequently the cam 50 is rigidly and fixedly secured in the lower end of the counterbore 33 in the piston portion 30.

The cam 50 on one side thereof, i. e., its inner side as viewed in the drawing, is provided with three identical equally circularly spaced cam surface portions identified generally at 51. Each of the cam surface portions 51 includes a low bearing surface 52, a high bearing surface 53 and a medium bearing surface 54. The low bearing surfaces 52 are connected to the high bearing surfaces 53 by inclined surface portions 55 and to the medium bearing surfaces 54 by inclined surface portions 56. The high bearing surfaces 53 are interconnected to the medium bearing surfaces 54 by inclined surface portions 57. The high bearing surfaces 53 are depressed between ribs 58 and 59 while the medium bearing surfaces 54 are depressed between the ribs 58 and a rib 60. When the cam ring 50 is secured in the piston portion 30 the valve spring retainer 44 will be supported thereby with the lugs 47 of the latter in engagement with either the bearing surfaces 52, 53 or 54 as the case may be. A retaining spring 61 engaging the bottom of the retainer 44 and the inner end of the counterbore 33 in the piston maintains the lugs 47 in engagement with the bearing surfaces of the cam ring 50.

When it is desired to adjust the tension of the recoil valve spring 46 and to change the size of the recoil orifice the shock absorber is collapsed by moving the piston toward the member 19 until the lug 49 engages and bottoms in the recess or socket 22 of the member 19 whereupon the retainer 44 is raised inwardly of the counterbore 33 to slightly compress the spring 61 and to raise the lugs 47 off of the bearing surfaces of the cam ring. Then relative rotation between the piston and the member 19 in the desired direction and in the proper amount will position the lugs 47 of the retainer in alignment with the low bearing surfaces 52 or the high bearing surfaces 53 or the medium bearing surfaces 54 as the case may be. Then when the piston is moved slightly away from the member 19 the spring 61 causes the lugs 47 to engage the aligned bearing surfaces of the cam ring and said lugs will be held in contact with such bearing surfaces and vibrations will not disengage the lugs from the bearing surfaces due to the ribs 58, 59 and 60.

It will be seen that when the adjustment is made so the lugs 47 engage the low bearing surfaces 52 that then the spring 46 will exert the minimum spring load on the recoil valve 42 wihle the recoil orifice will have the maximum capacity. When the lugs 47 are adjusted to engage the medium bearing surfaces 54 then the spring 46 will exert a medium spring load on the recoil valve 42 while the valve pin 43 will be so located as to provide a medium capacity recoil or rebound orifice. When the lugs 47 engage the high bearing surfaces 53 of the cam ring 50 then the maximum spring load will be exerted on the recoil valve 42 and the minimum capacity recoil orifice will be provided.

A brief resume of the operation of the shock absorber will be set forth. It may be assumed that the shock absorber is properly mounted on a vehicle and contains the proper supply of oil in the working cylinder 17 and in the reservoir 18. The impact piston valve 38 during the impact or downward stroke of the piston will unseat as soon as a predetermined pressure obtains to overcome the spring 40 so that oil can pass freely from the underside of the piston to the upper side thereof, it being understood that such oil would pass through the grooves or passages 32 and thence through the grooves or channels 36 on the circumferences of the two piston portions. Also the entering piston rod displaced a volume of oil and this additionally increases the pressure within the working cylinder, but this pressure is compensated for by the opening of the valve 21 to allow oil to flow from the working cylinder to the reservoir.

The vehicle springs which previously have been compressed now expand, and the piston moves upwardly in the cylinder 17 in its rebound or recoil stroke. During this movement, the impact piston valve 38 will be seated, i. e., the position shown in Fig. 1 so that at first oil can only flow from the upper side of the piston to the lower side thereof through the "recoil or rebound orifice" formed by the space between the circumference of the valve pin 53 and the circumference of the opening in the "recoil or rebound valve" 42. However, as soon as the pressure above the piston becomes sufficiently strong to overcome the spring load of the spring 46, the "rebound or recoil valve" 42 will move off its seat 41 so that oil can flow through the ports 37 and through bore 34 into the counterbore 33 and thence to the underside of the piston. The mode in which the shock absorber functions is well known in the art and need not be set forth in greater detail; however, it should be understood that during the rebound or recoil stroke of the piston, the replenishing valve 20 unseats to provide return of oil from the reservoir into the working cylinder.

Although a preferred embodiment of the invention has been illustrated and described herein, it will be understood that the invention is susceptible of various modifications and adaptations within the scope of the appended claims.

Having thus described my invention, I claim:

1. In a direct double-acting hydraulic shock absorber, a cylinder having an end wall, a piston slidable in said cylinder toward and from said end wall and having a passage extending from one side of the piston and a chamber extending from the other side thereof and communicating with said passage and provided with a valve seat, a separate cam ring fixed in said chamber, a rotatable retainer in said chamber having a surface cooperating with said cam ring and also having a valve pin fixed thereto and extending longitudinally of the chamber, a valve movable on said pin toward and from said seat to control communication between said passage and chamber, a spring carried by said retainer and acting on said valve to exert a valve seating spring load thereon, a spring in said chamber holding said retainer against said cam ring, said retainer and said end wall being provided with interengaging means when said piston is moved adjacent to said end wall, said valve pin at its end remote from said retainer having a plurality of different diameter portions while said valve is provided with an opening through which said end of said valve pin extends, the opening in said valve being of such diameter that different clearance spaces are provided between the circumference of the opening and the valve pin depending on the diameter of the portion that is located in said opening, wherefore the relative rotation between said piston and end wall when said means are interengaged results in relative rotation between said retainer and cam ring to adjust said retainer inwardly or outwardly of the piston chamber to increase or diminish the spring load on said valve pin and to vary the clearance between the circumference of the opening in the valve and the circumference of the valve pin to provide an adjusted orifice when said valve is seated.

2. In a direct double acting hydraulic shock absorber, a cylinder having an end wall, a piston slidable in said cylinder and movable toward said end wall during its impact stroke and away from said end wall during its rebound stroke and having a passage extending from that side of the piston remote with respect to said end wall and a chamber extending from the side thereof that is toward said end wall and communicating with said passage and provided with a valve seat, a separate cam ring fixed in said chamber, a rotatable retainer in said chamber having a surface cooperating with said cam ring and also having a valve pin fixed thereto and extending longitudinally of the chamber toward said passage, a rebound valve movable on said pin toward and from said seat to control communication between said passage and chamber during the rebound stroke of the piston, a spring carried by said retainer and acting on said valve to exert a valve seating spring load thereon, a spring in said chamber holding said retainer against said cam ring, said retainer and said end wall being provided with interengaging means when said piston is moved adjacent said end wall, said rebound valve being a disk provided with a central opening, while said valve pin has its free end extending through said opening and formed of different diameter portions providing variable clearance between the circumference of said opening and the circumference of the pin depending upon the diameter of the portion located in said opening thus providing a variable rebound orifice, wherefore relative rotation between said piston and end wall when said means are interengaged results in relative rotation between said retainer and cam ring to adjust said retainer inwardly or outwardly of the piston chamber to increase or diminish the spring load on said rebound valve and to diminish or increase the rebound orifice formed by the clearance between the circumference of the opening in the rebound valve and the circumference of the valve pin.

3. In a direct double acting hydraulic shock absorber as defined in claim 2 and wherein the free end of said valve pin is formed with two cylindrical portions of different diameter interconnected by a conical portion.

References Cited in the file of this patent
UNITED STATES PATENTS

| | | |
|---|---|---|
| 2,396,227 | Beecher | Mar. 12, 1946 |
| 2,487,472 | Patriquin | Nov. 8, 1949 |